(12) United States Patent
Svensson et al.

(10) Patent No.: US 8,646,257 B2
(45) Date of Patent: Feb. 11, 2014

(54) METHOD FOR ESTIMATING SOOT LOADING IN A DIESEL PARTICULATE FILTER, AND ENGINE AND AFTERTREATMENT SYSTEM

(75) Inventors: Kenth I. Svensson, Dunlap, IL (US); Chun Tai, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 322 days.

(21) Appl. No.: 13/062,620

(22) PCT Filed: Sep. 10, 2008

(86) PCT No.: PCT/US2008/075752
§ 371 (c)(1),
(2), (4) Date: Mar. 7, 2011

(87) PCT Pub. No.: WO2010/030269
PCT Pub. Date: Mar. 18, 2010

(65) Prior Publication Data
US 2011/0162352 A1    Jul. 7, 2011

(51) Int. Cl.
*F01N 3/00* (2006.01)

(52) U.S. Cl.
USPC ............. 60/295; 60/274; 60/286; 60/297; 60/311; 703/5; 703/8

(58) Field of Classification Search
USPC .......... 60/274, 286, 295, 297, 300, 303, 311; 703/5, 8
See application file for complete search history.

(56) References Cited

U.S. PATENT DOCUMENTS

| | | | |
|---|---|---|---|
| 6,829,889 B2 | 12/2004 | Saito et al. | |
| 6,829,890 B2 * | 12/2004 | Gui et al. | 60/295 |
| 6,941,750 B2 * | 9/2005 | Boretto et al. | 60/297 |
| 7,065,960 B2 * | 6/2006 | Gioannini et al. | 60/295 |
| 7,174,706 B2 | 2/2007 | Kuboshima et al. | |
| 7,272,926 B2 | 9/2007 | Kosaka | |
| 7,474,953 B2 * | 1/2009 | Hulser et al. | 701/108 |
| 7,478,527 B2 | 1/2009 | Wills | |
| 7,484,357 B2 * | 2/2009 | Dollmeyer et al. | 60/274 |
| 2007/0193256 A1 | 8/2007 | Matsuno et al. | |
| 2008/0034738 A1 * | 2/2008 | Singh et al. | 60/295 |
| 2008/0202103 A1 | 8/2008 | Henderson et al. | |

FOREIGN PATENT DOCUMENTS

| | | |
|---|---|---|
| CN | 101219314 A | 7/2008 |
| JP | H07-042537 | 10/1995 |
| JP | 2008-101603 | 5/2008 |
| JP | 2008059166 A1 | 5/2008 |
| WO | 03025265 A1 | 3/2003 |
| WO | 2008036010 A1 | 3/2008 |

OTHER PUBLICATIONS

Japanese Official Action (Sep. 26, 2012) from corresponding Japanese Application No. 2011-526835 (translation).

(Continued)

*Primary Examiner* — Binh Q Tran
(74) *Attorney, Agent, or Firm* — WRB-IP LLP

(57) ABSTRACT

A method for estimating soot loading of a diesel particulate filter includes establishing a soot loading model for estimating soot loading of a nominal diesel particulate filter, adjusting the soot loading model for a subject filter to account for differences between the nominal filter and the subject filter, and estimating soot loading of the subject filter using the adjusted soot loading model. An engine with a diesel particulate filter is also provided.

20 Claims, 2 Drawing Sheets

(56) References Cited

OTHER PUBLICATIONS

International Search Report for corresponding international Application PCT/US2008/075752, Dated—May 9, 2011.

International Preliminary Report on Patentability for corresponding International Application PCT/US2008/075752, Dated—May 9, 2011.

* cited by examiner

METHOD FOR ESTIMATING SOOT LOADING IN A DIESEL PARTICULATE FILTER, AND ENGINE AND AFTERTREATMENT SYSTEM

BACKGROUND AND SUMMARY

The present invention relates generally to diesel particulate filters and, more particularly, to methods and apparatus for estimating soot loading in a diesel particulate filter.

Diesel particulate filter (DPF) systems are becoming more common in many markets, particularly heavy duty truck markets, and will likely remain as an important emission solution for particulate matter for some time to come. There are various methods to estimate the accumulated soot mass in the DPF but, currently, there is only one direct feedback mechanism, namely, a pressure drop (dP) sensor that measures pressure drop across the DPF.

The dP signal can be used to estimate DPF soot mass through a correlation or model, usually based on observation of numerous filters over a period of time, thereby establishing data for what shall be referred to as a "nominal" DPF. The model inputs have several uncertainties. Aside from typical sensor uncertainties such as offset, hysteresis, temperature drift, time drift, etc., there are additional factors that affect model accuracy. These factors include DPF-to-DPF variations, ash loading of the filters, non-uniform soot loading, catalyst sintering, and the like, all of which make it difficult to confidently compare pressure drop data of a subject filter with pressure drops across a nominal DPF to estimate soot loading of the subject DPF based on soot loading of the nominal DPF.

If soot loading of the subject DPF cannot be estimated with a reasonable degree of accuracy, then damage to the DPF may result, or the DPF may cease to perform acceptably to filter particles. If the estimated soot loading of the subject DPF is too low, then the subject DPF may be overloaded with soot before an active regeneration operation is performed, and the regeneration operation may not burn off acceptable levels of the accumulated soot. If estimated soot loading of the subject DPF is too high, then the subject DPF may be subjected to excessive regeneration operations, which can shorten its useful life.

It is desirable to provide a technique for improving the accuracy of soot loading estimates for DPFs.

In accordance with an aspect of the present invention, a method for estimating soot loading of a diesel particulate filter comprises establishing a soot loading model for estimating soot loading of a nominal diesel particulate filter, adjusting the soot loading model for a subject filter to account for differences between the nominal filter and the subject filter, and estimating soot loading of the subject filter using the adjusted soot loading model.

In accordance with another aspect of the present invention, a diesel engine with an exhaust aftertreatment system comprises a subject diesel particulate filter, and a controller, the controller comprising a soot loading model for estimating soot loading of a nominal diesel particulate filter, the controller being adapted to adjust the soot loading model for the subject filter to account for differences between the nominal filter and the subject filter, and being adapted to estimate soot loading of the subject filter using the adjusted soot loading model.

BRIEF DESCRIPTION OF THE DRAWING

The features and advantages of the present invention are well understood by reading the following detailed description in conjunction with the drawing in which like numerals indicate similar elements and in which.

DETAILED DESCRIPTION

Figure 1:
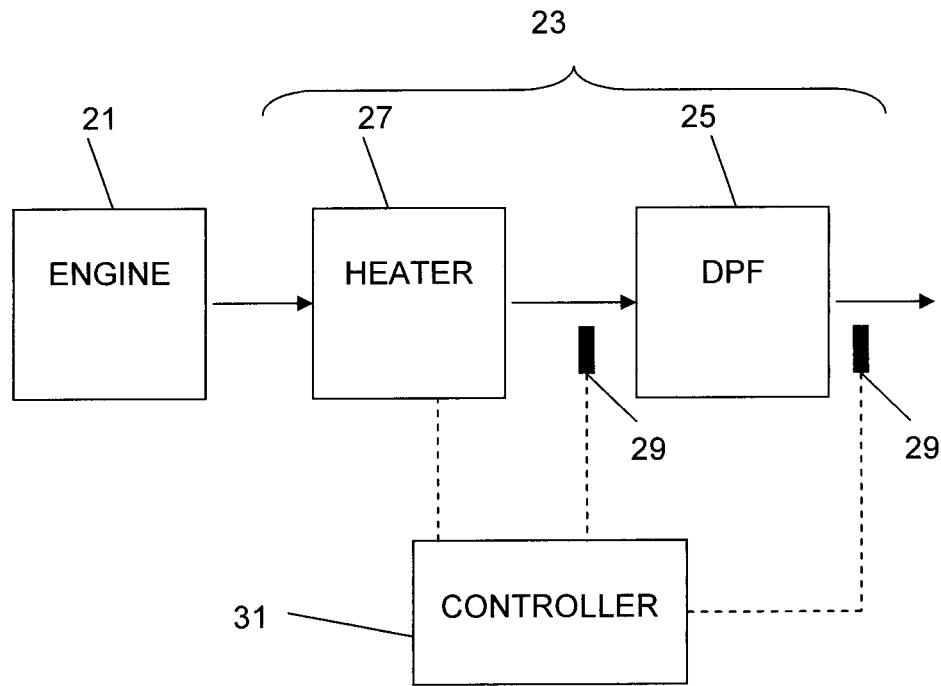
FIG. 1 is a schematic view of an engine with an exhaust aftertreatment system according to an aspect of the present invention.

A diesel engine 21 with an exhaust aftertreatment system 23 according to an aspect of the present invention is shown in FIG. 1. The aftertreatment system 23 comprises a diesel particulate filter 25 (DPF) downstream from the engine 21. The DPF 25 will hereinafter be referred to as the "subject" DPF to distinguish it from a nominal DPF used for purposes of comparison. The subject DPF 25 may be a catalyzed filter.

A heater 27 is provided upstream of the subject DPF 25 and is adapted to raise the temperature of the exhaust from the engine 21 entering the DPF to perform active regeneration of the subject DPF. A sensor 29 is provided for sensing at least one condition of the subject DPF 25. The sensor 29 is arranged to send a signal to a controller 31 to cause the heater 27 to initiate an active regeneration operation in response to the signal. The at least one condition can be at least one of pressure drop across the subject DPF 25, fuel consumption of the engine 21, distance traveled by a vehicle including the engine, and operating time of the engine or the filter. The at least one condition corresponds to an estimated level of soot loading of the subject filter 25. The aftertreatment system 23 will ordinarily include other aftertreatment devices, such as a diesel oxidation catalyst (DOC) (not shown). A DOC, however, may also be considered to be a type of heater 27 or may be provided in connection with a separate heater, such as a burner or an electric heater.

The controller 31 is any suitable type of controller, such as a computer. The controller 31 comprises a soot loading model for estimating soot loading of a nominal DPF. The model is typically programmed into the controller based upon observations of actual filters under various operating conditions, e.g., different atmospheric pressures, exhaust temperatures, length of operation, etc. The controller 31 is adapted to adjust the soot loading model for the subject DPF 25 to account for differences between the nominal DPF and the subject DPF. The controller 31 is also adapted to estimate soot loading of the subject DPF 25 using the adjusted soot loading model.

Figure 2:
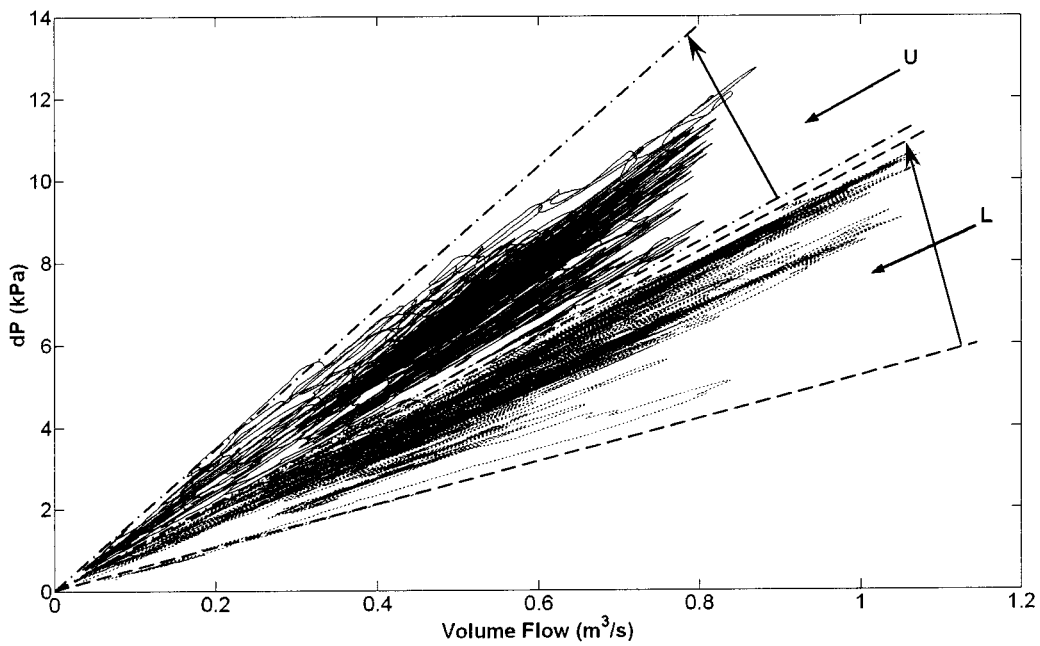
FIG. 2 shows differences between pressure drop and volume flow measurements for two different diesel particulate filters.
Figure 3:
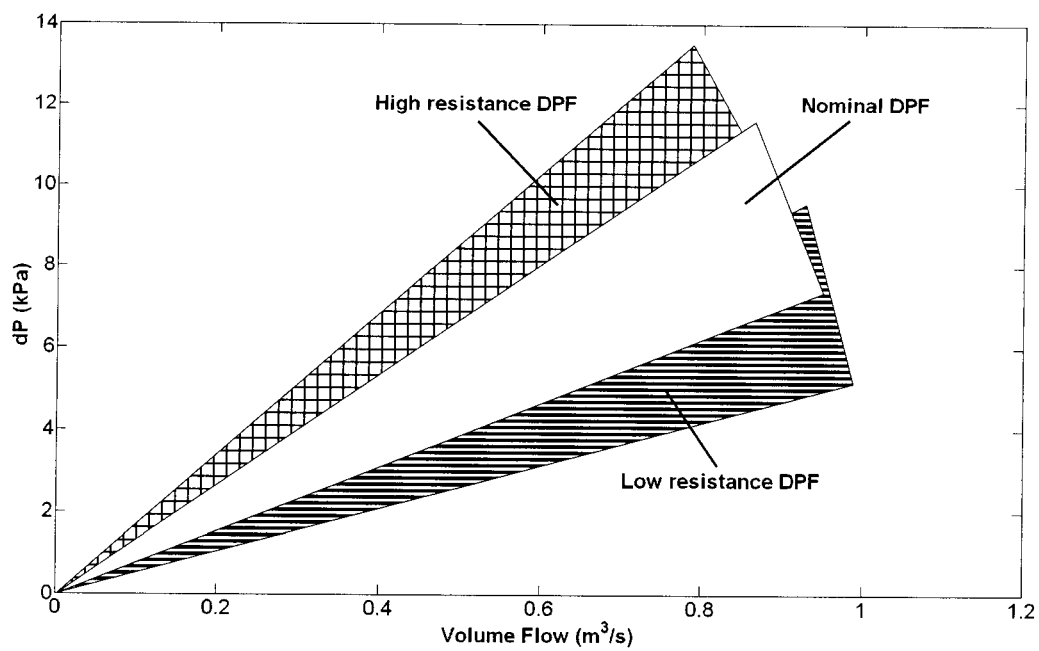
FIG. 3 schematically compares pressure drop versus volume flow ranges for a nominal filter, a high resistance filter, and a low resistance filter.

According to an aspect of the present invention, the soot loading model for the subject DPF 25 is adjusted to account for differences between the nominal DPF and the subject DPF. For example, FIG. 2 shows two sets of dP (pressure drop across the DPF) versus volume flow (across the DPF) measurements for two DPFs from two trucks. Each set comprises a plurality of separate measurements taken at different times between start-up and active regeneration of each filter.

For purposes of discussion, the lower set L of dP versus volume flow measurements will be considered to represent data for a nominal DPF, and the upper set U of dP versus volume flow measurements will represent data for a subject DPF. It will be appreciated, however, that differences between a nominal DPF and a subject DPF may be such that a set of dP versus volume flow measurements for the subject DPF may be lower than the set of dP versus volume flow measurements for the nominal filter, such as is shown in FIG.

3, which schematically compares ranges of dP versus volume flow for a nominal DPF with ranges for a high resistance DPF and a low resistance DPF. In FIG. 2, the dashed lines at the bottom of the L and U sets of measurements are provided to assist in showing approximately the dP versus volume flow for a new filter or a filter immediately after active regeneration.

In some aspects of the present invention, adjusting the soot loading model for the subject DPF comprises multiplying the dP versus volume flow curves for the subject DPF by a factor so that they approximate the curves for the nominal DPF. For example, the slope of the dashed line at the bottom of the U measurements could be multiplied by a factor so that it equals the slope of the dashed line at the bottom of the L measurements, if the L measurements reflected dP versus volume flow for a nominal filter. Typically, the factor is determined by comparing dP versus volume flow curves or data points for a nominal filter and a subject filter that have each been de-greened, and that each have substantially no soot loading. This condition is ordinarily the condition after de-greening of a new filter or after complete active regeneration of an older filter. Of course, the factor might be determined in some other ways, such as by comparing dP versus volume flow curves or data points for the nominal filter and the subject filter at some other time, including or instead of just upon initial start-up after de-greening or immediately after active regeneration, or over a period of time.

Soot loading of the subject DPF 25 is estimated by the controller 31 using the adjusted soot loading model. To illustrate according to an aspect of the present invention wherein the dP versus volume flow curves or data points for the subject DPF 25 are multiplied by a factor to more closely conform to the curves or data points for the nominal DPF, soot loading can be estimated for the subject filter 25 by comparing a dP versus volume flow measurement for the subject filter, multiplied by an adjustment factor. Soot loading of the nominal filter at the dP versus volume flow values to which the subject filter measurements were adjusted by multiplying them by the factor can be estimated to correspond to soot loading for the subject DPF 25.

However estimated soot loading of the subject DPF 25 is determined, an active regeneration cycle will ordinarily be initiated when the estimated soot loading of the subject DPF exceeds a predetermined level. For example, if the soot loading model estimates soot loading as a function of pressure drop across the nominal DPF at some volume flow rate, pressure drop and volume flow rate across the subject DPF 25 can be monitored to obtain at least one pressure drop measurement at a particular volume flow rate, and soot loading of the subject DPF can be estimated as a function of the at least one pressure drop measurement at the particular volume flow rate. If the pressure drop measurement, as adjusted by whatever adjustment technique is employed, exceeds a predetermined value, a signal can be sent to the controller 31 which can send a signal to initiate active regeneration, e.g., by activating the heater 27.

According to another aspect of the present invention, soot loading of the subject DPF 25 can be estimated by calculating an error ($E(t)$) of the soot loading model for the subject DPF at time t according to the equation:

$$E(t) = \text{sum}(X(t) - X\text{bar})/T \qquad \text{EQ. 1}$$

where time $t = 0, 1, 2, \ldots, T$ $X(t)$ is a calculated value for soot loading of the subject DPF at a given filter condition, Xbar is a calibrated value for soot loading of the nominal DPF at the given filter condition. Xbar can be a constant value or a time-varying value based on real measurements or an internal mass model prediction.

At time T, an offset value $Z(t)$ is determined by:

$$Z(t) = Z(t-1) + G^*[E(t-1) - Z(t-1)] \qquad \text{EQ. 2}$$

where G is a factor corresponding to reliability of soot loading data between time $t=0$ and time $t=T$. The estimated value $Xa(t)$ for soot loading of the subject DPF can be determined according to the equation $$Xa(t) = X(t) - Z(t). \qquad \text{EQ. 3}$$

Adding an offset value $Z(t)$ is one simple and practical way to adjust the dP soot model to minimize the model error.

There are certainly other methods to adjust the dP soot model than by adding the offset value $Z(t)$. For example, one could adjust the dP soot model parameters used in EQ. 4, below, or even the structure of the model to eliminate the error.

According to another aspect of the invention, the soot loading model determines soot loading via pressure drop across the nominal DPF according to a pressure drop equation:

$$dP_{nom} = \mu(T) u_{wall} \left[ \frac{w_{nom\text{-}wall}}{k_{nom\text{-}wall}} + \frac{w_{soot}}{k_{soot}} \right] \qquad \text{EQ. 4}$$

where $dP_{nom}$ is pressure drop across the nominal DPF,
$\mu(T)$ is viscosity of exhaust gas at temperature T,
$u_{wall}$ is wall flow velocity,
$w_{nom.\,wall}$ is wall thickness of the nominal DPF,
$k_{nom.\,wall}$ is permeability of the nominal DPF,
$w_{soot}$ is thickness of a soot layer, and
$k_{soot}$ is permeability of the soot layer.

The soot loading model can be adjusted for the subject DPF 25 by multiplying one or both of $w_{wall}$ or $k_{wall}$ by a factor so that the equation accurately calculates zero soot loading in the subject DPF. For example, if, at start-up or after complete active regeneration, when $w_{soot}$ should be equal to zero or substantially zero, if dP for the subject DPF 25 at a particular $\mu(T)$ and $u_{wall}$ differs from dP at that $\mu(T)$ and $u_{wall}$ for a nominal filter, then one or both of $w_{wall}$ or $k_{wall}$ can be multiplied by an adjustment factor so that the adjusted dP equals the dP for the nominal filter at zero soot loading.

The foregoing equation for pressure drop is one possible simplified version of a more complex equation. The simplified pressure drop equation is ordinarily an approximation of a more complex equation considering a host of variables. To illustrate, a more complex pressure drop equation (and assuming incompressible flow and no ash deposits) applicable to at least certain models of filters can be represented by:

$$\Delta P = \frac{\mu Q}{2 V_{trap}} (\alpha + w_s)^2 \left[ \frac{w_s}{k\alpha} + \frac{1}{2k_{soot}} \ln\!\left(\frac{\alpha}{\alpha - 2w}\right) + \frac{4FL^2}{3}\left(\frac{1}{(\alpha - 2w)^4} + \frac{1}{\alpha^4}\right) \right] + \frac{\rho Q^2 (\alpha + w_s)^4}{V_{trap}^2 \alpha^2} \left[ \frac{\beta w_s}{4} + 2\zeta\!\left(\frac{L}{\alpha}\right)^2 \right] \qquad \text{EQ. 5}$$

where:

$$\beta = \frac{1.75}{\varepsilon^{3/2} \sqrt{150 k}}$$

ε=porosity of DPF
α=channel width
w=thickness of soot cake
$w_s$=thickness of substrate wall
μ=viscosity of exhaust
Q=volume flow of exhaust
$V_{trap}$=DPF volume
k=permeability of DPF
F=28.454
L=channel length
ρ=density of exhaust
ζ~0.67-0.82

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for estimating soot loading of a diesel particulate filter, comprising:
   establishing a soot loading model for estimating soot loading of a nominal diesel particulate filter,
   adjusting the soot loading model for a subject filter to account for differences between the nominal filter and the subject filter; and
   estimating soot loading of the subject filter using the adjusted soot loading model.

2. The method as set forth in claim 1, comprising initiating an active regeneration cycle when the estimated soot loading of the subject filter exceeds a predetermined level.

3. The method as set forth in claim 1, wherein the soot loading model estimates soot loading as a function of pressure drop across the nominal filter.

4. The method as set forth in claim 3, comprising monitoring pressure drop across the subject filter to obtain at least one pressure drop measurement and estimating soot loading of the subject filter as a function of the at least one pressure drop measurement.

5. The method as set forth in claim 1, comprising determining differences between the nominal filter and the subject filter based on a de-greened nominal filter and a de-greened subject filter.

6. The method as set forth in claim 5, comprising determining differences between the nominal filter and the subject filter based on a new subject filter.

7. The method as set forth in claim 5, comprising determining differences between the nominal filter and the subject filter after active regeneration of the subject filter.

8. The method as set forth in claim 1, wherein establishing the model comprises establishing a first curve of nominal pressure drop across the nominal filter versus volume flow rate, the method comprising defining a second curve of measured pressure drop values across the subject filter versus volume flow rate through the subject filter, and wherein adjusting the soot loading model comprises multiplying values on the second curve by a factor such that the second curve approximates the first curve.

9. The method as set forth in claim 8, wherein the adjusted soot loading model estimates soot loading as a function of the measured pressure drop across the subject filter.

10. The method as set forth in claim 1, wherein establishing the model comprises establishing nominal pressure drop across the nominal filter at a plurality of volume flow rates, the adjusting step comprises measuring pressure drop across the subject filter at the volume flow rates and multiplying the measured pressure drops at the volume flow rates by a factor such that the measured pressure drops across the subject filter approximate values of the nominal pressure drop at the volume flow rates.

11. The method as set forth in claim 10, wherein the estimating step comprises multiplying a measured pressure drop at a volume flow rate by a factor corresponding to the volume flow rate to obtain an adjusted pressure drop, and comparing the adjusted pressure drop to a nominal pressure drop at the volume flow rate.

12. The method as set forth in claim 1, wherein an error (E(t)) of the soot loading model for the subject filter at time t equals $$E(t)=\text{sum}(X(t)-X\text{bar})/T,$$

where time t=0, 1, 2, ..., T
   X(t) is a calculated value for soot loading of the subject filter at a given filter condition,
   Xbar is a calibrated value for soot loading of the nominal filter at the given filter condition, and at time T, the offset value Z(t) by which the calculated value X(t) can be offset to provide the estimated value Xa(t) for soot loading is represented by the equation:

$$Z(t)=Z(t-1)+G*[E(t-1)-Z(t-1)]$$

where G is a factor corresponding to reliability of soot loading data between time t=0 and time t=T, and the estimated value Xa(t) for soot loading, of the subject filter is represented by the equation Xa(t)=X(t)−Z(t).

13. The method as set forth in claim 1, wherein the soot loading model determines soot loading as a function of pressure drop across at least part of the nominal filter.

14. The method as set forth in claim 13, wherein the soot loading model is adjusted for the subject filter by multiplying $w_{wall}$ by a factor so that the equation accurately calculates zero soot loading in the subject filter.

15. The method as set forth in claim 13, wherein the soot loading model is adjusted for the subject filter by multiplying $k_{wall}$ by a factor so that the equation accurately calculates zero soot loading in the subject filter.

16. A diesel engine with an exhaust aftertreatment system, comprising:
   a subject diesel particulate filter;
   a controller, the controller comprising a soot loading model for estimating soot loading of a nominal diesel particulate filter, the controller being adapted to adjust the soot loading model for the subject filter to account for differences between the nominal filter and the subject filter, and being adapted to estimate soot loading of the subject filter using the adjusted soot loading model.

17. The diesel engine with exhaust aftertreatment system as set forth in claim 16, wherein the subject filter is a catalyzed filter.

18. The diesel engine with exhaust aftertreatment system as set forth in claim 16, comprising a heater for active regeneration of the subject filter.

19. The diesel engine with exhaust aftertreatment system as set forth in claim 18, comprising a sensor for sensing at least one condition of the subject filter and sending a signal to the controller to initiate active regeneration in response to the signal.

20. The diesel engine with exhaust aftertreatment system as set forth in claim 19, wherein the at least one condition is at least one of pressure drop, fuel consumption, distance traveled, and operating time.

* * * * *